(12) United States Patent
Ostorero et al.

(10) Patent No.: US 9,587,654 B2
(45) Date of Patent: Mar. 7, 2017

(54) ACTUATING ASSEMBLY FOR MOVING AN OPERATIVE MEMBER OF A GLASSWARE FORMING MACHINE

(71) Applicant: BOTTERO S.p.A., Cuneo (IT)

(72) Inventors: Marcello Ostorero, Vignolo (IT); Luca Macagno, Peveragno (IT); Davide Scotto, Varazze (IT); Lorenzo Armando, Cuneo (IT); Fabio Basiglio, Mondovi' (IT)

(73) Assignee: BOTTERO S.P.A., Cuneo (IT)

( * ) Notice: Subject to any disclaimer, the term of this patent is extended or adjusted under 35 U.S.C. 154(b) by 288 days.

(21) Appl. No.: 14/558,274

(22) Filed: Dec. 2, 2014

(65) Prior Publication Data
US 2015/0152893 A1    Jun. 4, 2015

(30) Foreign Application Priority Data

Dec. 4, 2013 (IT) ............................... TO2013A0990

(51) Int. Cl.
| | |
|---|---|
| *C03B 7/14* | (2006.01) |
| *F15B 15/06* | (2006.01) |
| *C03B 7/16* | (2006.01) |
| *C03B 9/16* | (2006.01) |
| *C03B 9/193* | (2006.01) |
| *C03B 9/40* | (2006.01) |

(52) U.S. Cl.
CPC ................ *F15B 15/06* (2013.01); *C03B 7/14* (2013.01); *C03B 7/16* (2013.01); *C03B 9/165* (2013.01); *C03B 9/1932* (2013.01); *C03B 9/403* (2013.01)

(58) Field of Classification Search
CPC .............. F15B 15/06; C03B 7/14; C03B 7/16
USPC ............................................................ 92/129
See application file for complete search history.

(56) References Cited

U.S. PATENT DOCUMENTS

| | | | |
|---|---|---|---|
| 4,120,683 A | 10/1978 | Irwin | |
| 5,266,095 A * | 11/1993 | Futterknecht | ........... C03B 9/165 |
| | | | 65/234 |

FOREIGN PATENT DOCUMENTS

| | | |
|---|---|---|
| EP | 0915269 | 5/1999 |
| JP | H0967128 | 3/1997 |

OTHER PUBLICATIONS

Italian Search Report dated Jul. 28, 2013 corresponding to Italian Application No. TO2013A000990; 7 pages.

* cited by examiner

*Primary Examiner* — Thomas E Lazo
(74) *Attorney, Agent, or Firm* — Ohlandt, Greeley, Ruggiero & Perle, LLP

(57) ABSTRACT

In a glassware forming machine, an actuating assembly of an operative member has a connecting frame; a shaft for supporting the operative member coupled to the connecting frame to translate and rotate about a fixed axis thereof; a pneumatic jack for displacing the supporting shaft along the axis provided with a rod connected to the supporting shaft; a cam and tappet device for rotating the supporting shaft in opposite directions about the axis; and a hydraulic device for stabilizing the motion of the shaft; the rod having at least one hollow portion for housing the hydraulic motion stabilizing device.

15 Claims, 5 Drawing Sheets

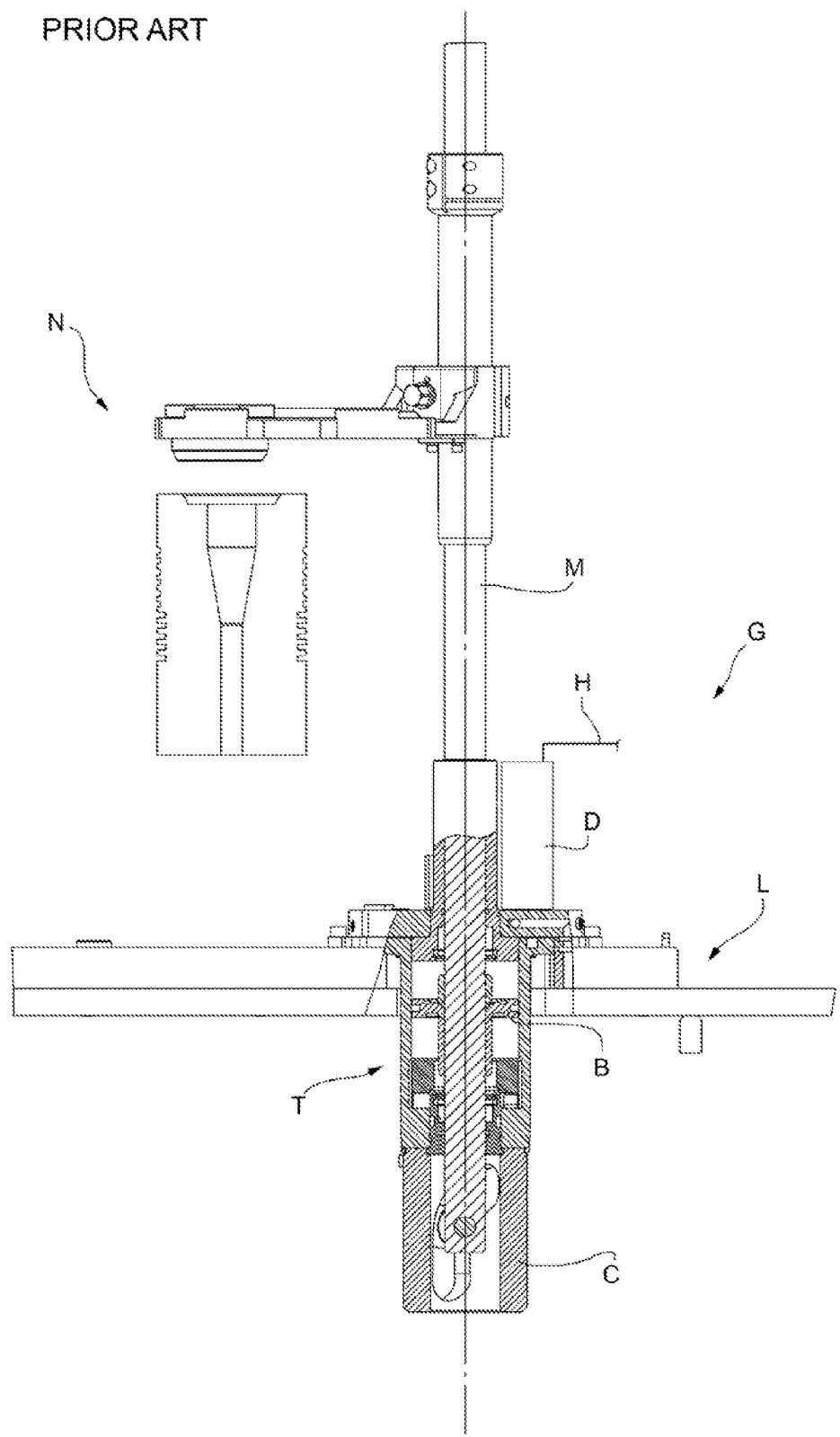

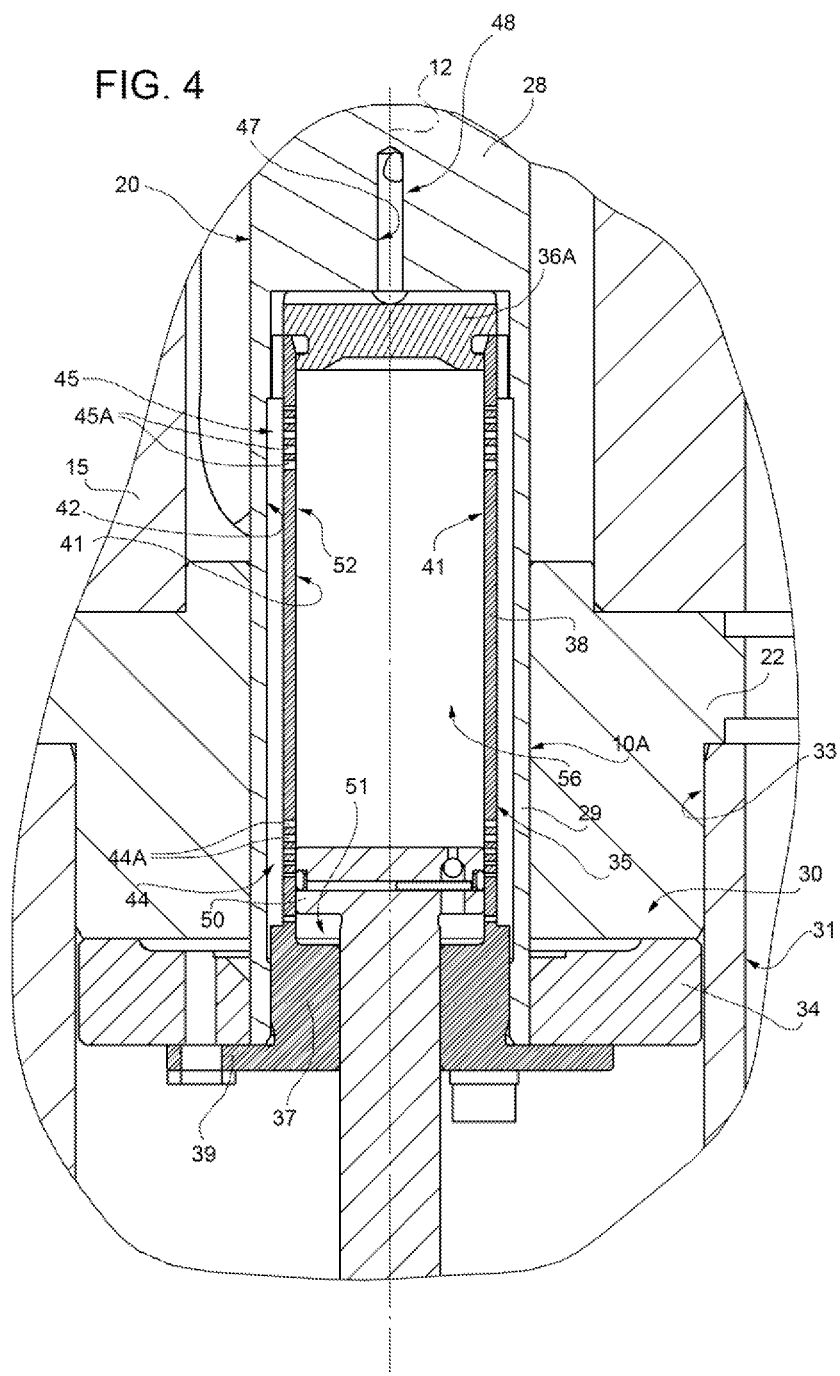

ACTUATING ASSEMBLY FOR MOVING AN OPERATIVE MEMBER OF A GLASSWARE FORMING MACHINE

The present invention relates to an actuating assembly for moving an operative member of a glassware forming machine.

BACKGROUND OF THE INVENTION

In particular, the present invention relates to an actuating assembly, for example of the type illustrated in FIG. 1A, for displacing a general operative member according with a roto-translation motion, and in the particular example described for displacing a funnel, or a baffle, or even a blowing head of an I.S. machine, respectively to convey a gob of glass into a glassware forming mold, to close an upper opening of the forming mold itself and to blow air into the inner cavity of the glassware being formed and make it assume the final shape.

The aforementioned roto-translation motion is obtained by combining a translation along a vertical axis to and from the forming mold and a rotation about the vertical axis itself from and to an operative position, in which the baffle, the funnel, or the blowing head are coupled to the forming mold.

Specifically, in FIG. 1A, reference G indicates a generic known actuating assembly, which extends through a box L of the machine and comprises a fixed frame T, a supporting shaft H of the operative member N coupled to the fixed frame coaxially to the vertical axis, a linear actuator B for translating the shaft along the vertical axis, a cam and tappet device C for rotating the shaft about the vertical axis itself and a hydraulic damping cartridge D for braking the operative member when it is arranged near its raised end-of-stroke position along the vertical axis. The damping along the stretch near the lowered end-of-stroke position, on the other hand, is performed by controlling the pneumatic actuator and varying, for example, the compressed air exhaust passage section.

The hydraulic damping cartridge is arranged over the linear actuator and the box and by the side of the shaft, and is connected to a dedicated hydraulic circuit H thereof.

On the other hand, the tappet and carts device is arranged under the linear actuator and comprises a fixed cam defined by a groove obtained in a side wall of a tubular body and a tappet element radially overhanging from a lower free end portion of the shaft and plunging into the tubular body. The cam has an upper ramp stretch and a lower stretch substantially rectilinear and vertical. The cam device is lubricated by means of oil accommodated in the tubular body.

Although universally used, the known actuating assemblies of the type described above are not very satisfactory for the following reasons.

First of all, despite being controlled by the hydraulic cartridge and by means of the pneumatic actuator, the known assemblies do not allow a smooth, controlled displacement of the operative member, which vibrates during its displacement oscillating forwards and backwards not only in the intermediate stretches comprised between the terminal end-of-stroke stretches but also in the ends-of-stroke stretches themselves.

The unexpected motion variation, for a part, is generated by the reciprocating motion of the pneumatic actuator and, for another part, is consequent to the geometry of the cam, the ramp section of which generates an obstacle to the movement during descent, which however fails immediately when the tappet element runs under the vertical stretch. In such a condition, the piston of the linear actuator undergoes a sudden acceleration which causes sudden variations of volume in both the upper chamber fed with compressed air and the lower chamber which is exhausting. The feeding of compressed air is not sufficient to avoid a lowering of the pressure in the feeding chamber, whereas the exhaust is not sufficient to avoid a raising of the pressure in the exhaust chamber. In many cases, the pressure variations in the mentioned chambers slow down or even stop the piston, which then suddenly restarts as soon as the pressures rebalance. Such faults cannot be overcome by acting on the pneumatic system.

As a consequence, the operative member often couples with the forming mold when the vibrations have not been exhausted or damped yet, so that relative sliding is generated, which generates early wear on both the mold and the operative member.

Besides, the shocks that the actuating member undergoes when the operative member reaches the molds or the actuator reaches the end of stroke, lead to early wear of the components of the actuating assembly itself.

Furthermore, because of the extremely small spaces in the cam zone, the radial loads transmitted by the tappet element to the plunging end portion of the shaft cannot be supported by inserting a supporting bearing or a bushing, and thus the end portion always works overhangingly with inevitable anomalous wear of the cam/tappet assembly.

Additionally, during the upward and downward movements of the shaft, the mentioned plunging end portion generates significant variations of volume in the mentioned tubular body, in which the lubricant oil is present, and it triggers pumping phenomena, which cause a progressive emptying of the tubular body because the oil either exits outwards or moves up the shaft and enters into the pneumatic cylinder.

Besides, the aforesaid known assemblies are not very safe because the presence of the damping cartridge by the side of the shaft, and thus in position close to the forming mold, implies the presence of flammable lubricant oil in a very hot tone of the machine itself, and consequently there is a real fire risk in case of leakage of oil from the cartridge or from the oil feeding circuit.

Furthermore, for the reasons above, the known assemblies do not allow to reduce the displacement times of the operative members beyond a given threshold and thus to increase the production rate of the forming machine in safe manner.

SUMMARY OF THE INVENTION

It is the object of the present invention to make an actuating assembly for moving an operative member, which allows to solve the aforementioned problems simply and cost-effectively.

According to the present invention, an actuating assembly for moving an operative member of a glassware forming machine is made, the assembly comprising a connecting frame adapted to be fixed to a supporting structure of the machine; a shaft for supporting the operative member and coupled to the connecting frame so as to translate and rotate about a fixed axis thereof; a pneumatic jack for displacing said shaft along said axis and comprising a rod connected to said shaft and a piston; a cam and tappet device for rotating the shaft in opposite directions about said axis; and hydraulic means for stabilizing the motion of said supporting shaft; characterized in that said rod comprises at least one hollow portion, and in that said stabilizing hydraulic means are housed in said hollow portion.

BRIEF DESCRIPTION OF THE DRAWINGS

The invention will now be described with reference to the accompanying drawings which illustrate a non-limitative embodiment thereof, in which:

FIG. 1A is a prior art actuating assembly;

DETAILED DESCRIPTION OF THE INVENTION

Figure 1:
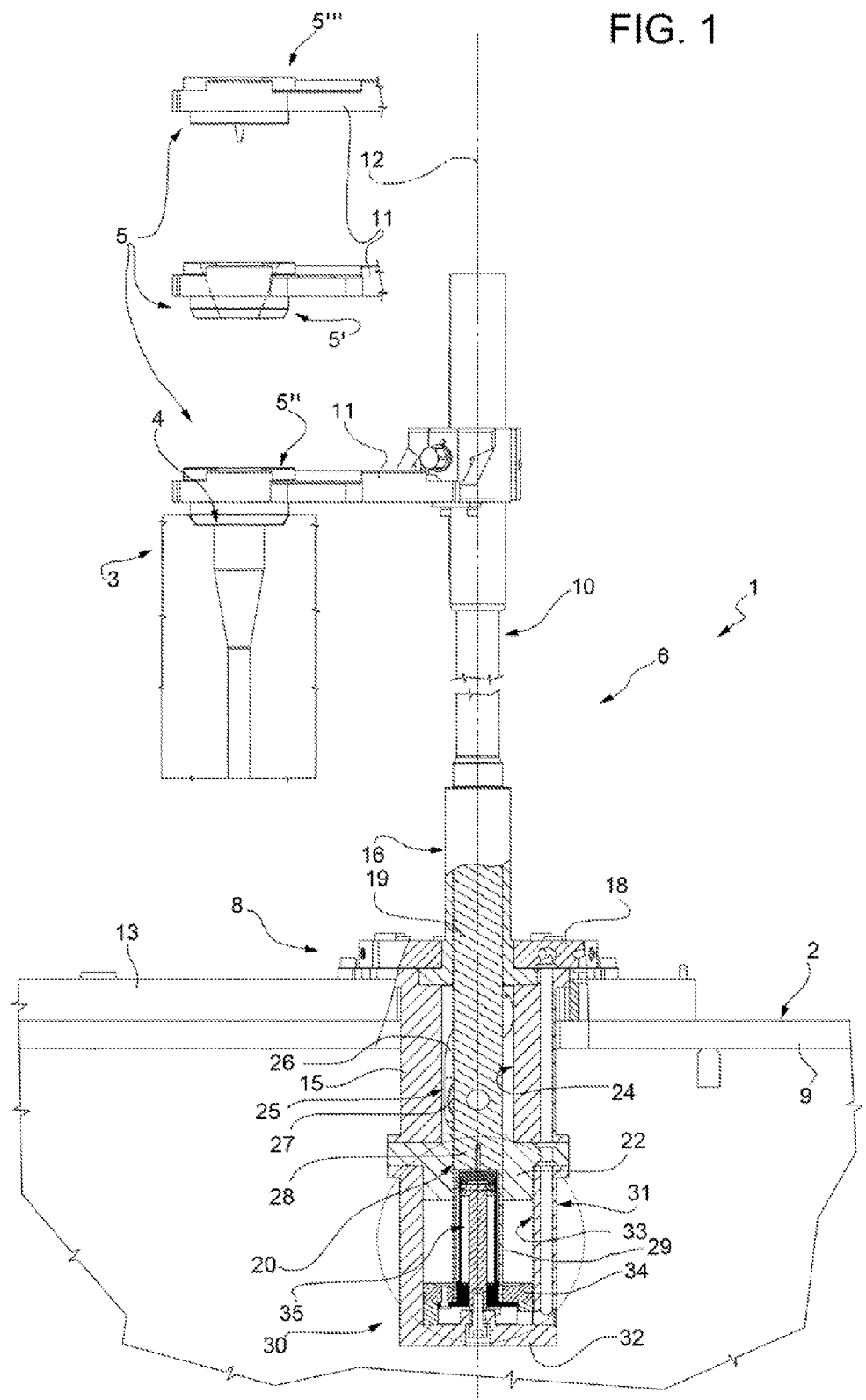
FIG. 1 shows a side elevation, partial section view of a preferred embodiment of the actuating assembly made according to the dictates of the present invention.

In FIG. 1, reference numeral 1 indicates a glassware forming machine, generally known as an I.S. machine, as a whole. The machine 1 comprises a mechanism box 2 (known) and a forming mold 3 (also known in itself and not described in detail) arranged over the box 2 and having an inlet 4 for a gob of glass.

The machine 1 further comprises operative members 5 (known in themselves), including a funnel 5' for inserting the gob of glass into the mold 3 through the inlet 4, a baffle 5" for closing the inlet 4 itself when the gob is inside the mold 3 and a blowing head 5''' for deforming the mass of glass accommodated in the mold.

In the machine 1, the operative members 5 are moved between a raised resting position distanced from the mold 3 and a lowered operative coupling position with the mold 3 itself by means of respective movement assemblies 6 independent from each other, only one of which is shown in FIG. 1 for the sake of clarity. The assemblies 6 are conceptually and functionally equal to each other.

Each assembly 6 comprises its own connecting frame 8 to the box 2. The frame 8 extends partially in the box 2 through an upper wall 9 of the box 2 itself, which according to applications may comprise a shim plate 13 or not.

Each assembly w further comprises a supporting and actuating shaft 10, which is conveniently made in one piece, supports the respective operative member 5 (in manner known in itself), e.g. by means of a bracket 11, and is coupled to a respective fixed frame 8 to translate and rotate about a respective vertical axis 12 thereof.

With specific reference to FIG. 1, the frame 8 comprises an annular dead plate 18 which rests on the plate 13 and a tubular body 15, which extends under the plate 13 through openings in the plate 13 and in the wall 9 coaxially to the axis 12 and has an outer upper radial flange coupled to the wall 9 in absence of the plate 13, or to the plate 13 itself, as in the illustrated case.

The frame 8 then comprises a tabular guiding body 16 extending upwards from the body 15 beyond the plate 13 or the wall 9 in absence of the plate 13 and having a lower outer radial flange forced against the body 15 of the annular dead plate 18 which is coupled to the plate 13 or to the wall 9 by means of the fastening screws (not shown in the accompanying figures).

The shaft 10 comprises an intermediate portion 19 coupled to the guiding body 16 in rotational, axially sliding manner, and ends on the bottom with an end portion 20 coupled, again in rotational and axially sliding manner, to a further guiding body 22 blocked onto the body 15 in releasable manner.

The guiding body 22 closes the tubular body 15 on the bottom and delimits a chamber 24 with the body 15 itself (FIG. 1) housing a cam and tappet assembly 25 for rotating the shaft ID about the axis 12 according to a motion profile (known in itself).

The assembly 25 comprises a fixed guiding cam 26 defined, in the specific case, by a groove obtained on an inner surface of the side wall of the body 15 and by a tappet element 27 defined by a roller orthogonal to the axis 12 and radially overhangingly protruding from the shaft 10 itself. The chamber 24 houses a lubricating liquid of the cam and tappet assembly 25.

Again with reference to FIG. 1, the end portion 20 comprises, in turn, a full upper stretch and a hollow lower end stretch 29.

The end stretch 29 defines a hollow rod of a pneumatic jack 30 for translating the shaft 10 along the axis 12 in opposite directions and to displace the operative member 5 between the mentioned resting and operating positions.

The jack 30 comprises a liner 31, one end portion of which surrounds and is stably connected to the guiding body 22 in fluid-tight manner and an opposite end portion of which is closed by a head 32, conveniently integral with the liner 31.

The guiding body 22, the liner 31 and the head 32 reciprocally delimit a chamber 33, in which a piston 34 of the jack 30 runs in fluid-tight manner integrally connected to a lower free end of the end stretch 29.

Figure 2:
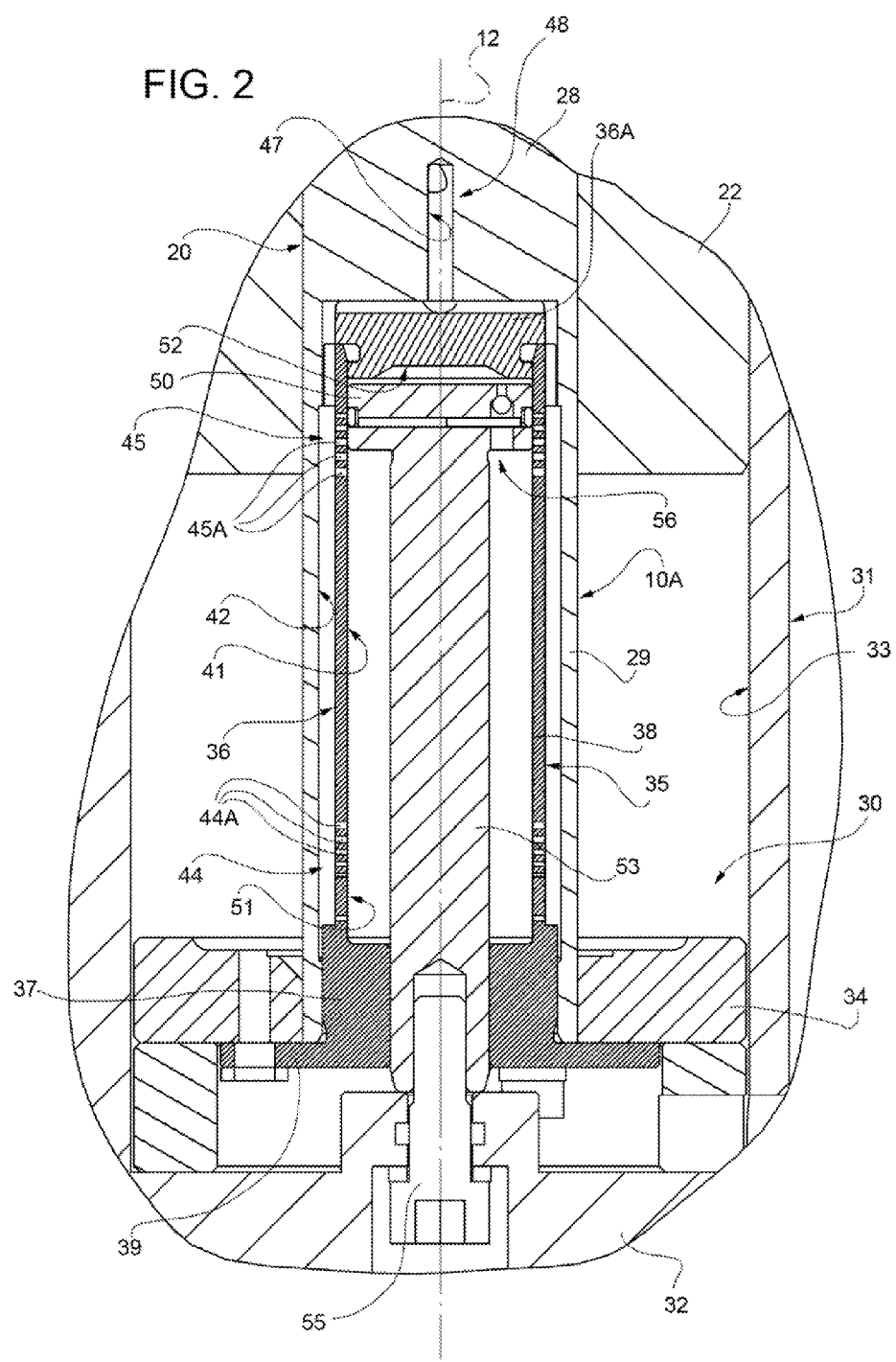
FIG. 2 shows a detail of FIG. 1 in section and on a highly enlarged scale; and the FIGS. 3 and 4 are similar to FIG. 2 and show the assembly in FIG. 1 in two different operative conditions.

Again with reference to FIG. 1, and in particular to FIG. 2, the end stretch or rod 29 fully houses a hydraulic damping or motion stabilizing cartridge 35 adapted to control the displacement of the shaft 10 and thus of the operative member 5.

With reference to FIG. 2, the hydraulic cartridge 35 comprises, in turn, a reversed cup-like body 36 and an upper fluid-tight closing plug 36A adjacent to the stretch 28. The cup-like body 36 comprises, in turn, a bottom wall 37 inserted in fluid-tight manner in a free end of the stretch 29 and a tubular inner portion 38 of the stretch 29 itself and coaxial to the axis 12. Conveniently, the bottom wall 37 has a radial flange 39 arranged abuttingly against a lower surface of the piston 34 and integrally connected to the piston 34 itself by means of screws.

The cup-shaped portion 36 delimits a cylindrical chamber 41 together with a plug 36A and an annular chamber 42 with stretches 28 and 29. The chamber 41 communicates with the annular chamber 42 through two series of calibrated holes, indicated by reference numerals 44 and 45. The series 44 of holes is arranged next to the bottom wall 37 and has a plurality of holes 44A extending orthogonally to the axis 12 and having decreasing diameters towards the wall 37.

On the other hand, the series 45 of holes is arranged next to the plug 36A and has a plurality of holes 45A extending orthogonally to the axis 12 and having decreasing diameters towards the plug 36A.

Again with reference to FIG. 2, the chamber 42 communicates with the chamber 24 through a duct 47 obtained within the stretch 28 of the shaft 10. Together with the chambers 24, 41, 42 and with the holes 44A and 45A, the duct 47 defines a closed hydraulic circuit 48, crossed by the lubricating liquid which, in the described assembly 6, performs the two-fold function of liquid lubricating the cam and tappet assembly 25 and of operative liquid controlling and stabilizing the motion of the shaft 10.

Again with reference to FIG. 2, the closed hydraulic circuit 48 extends completely within the casing 8 and with the exception of the chamber 24, entirely within a cylindrical surface 10A which, in the specific case, externally delimits both the rod 29 and the shaft 10.

Figure 3:
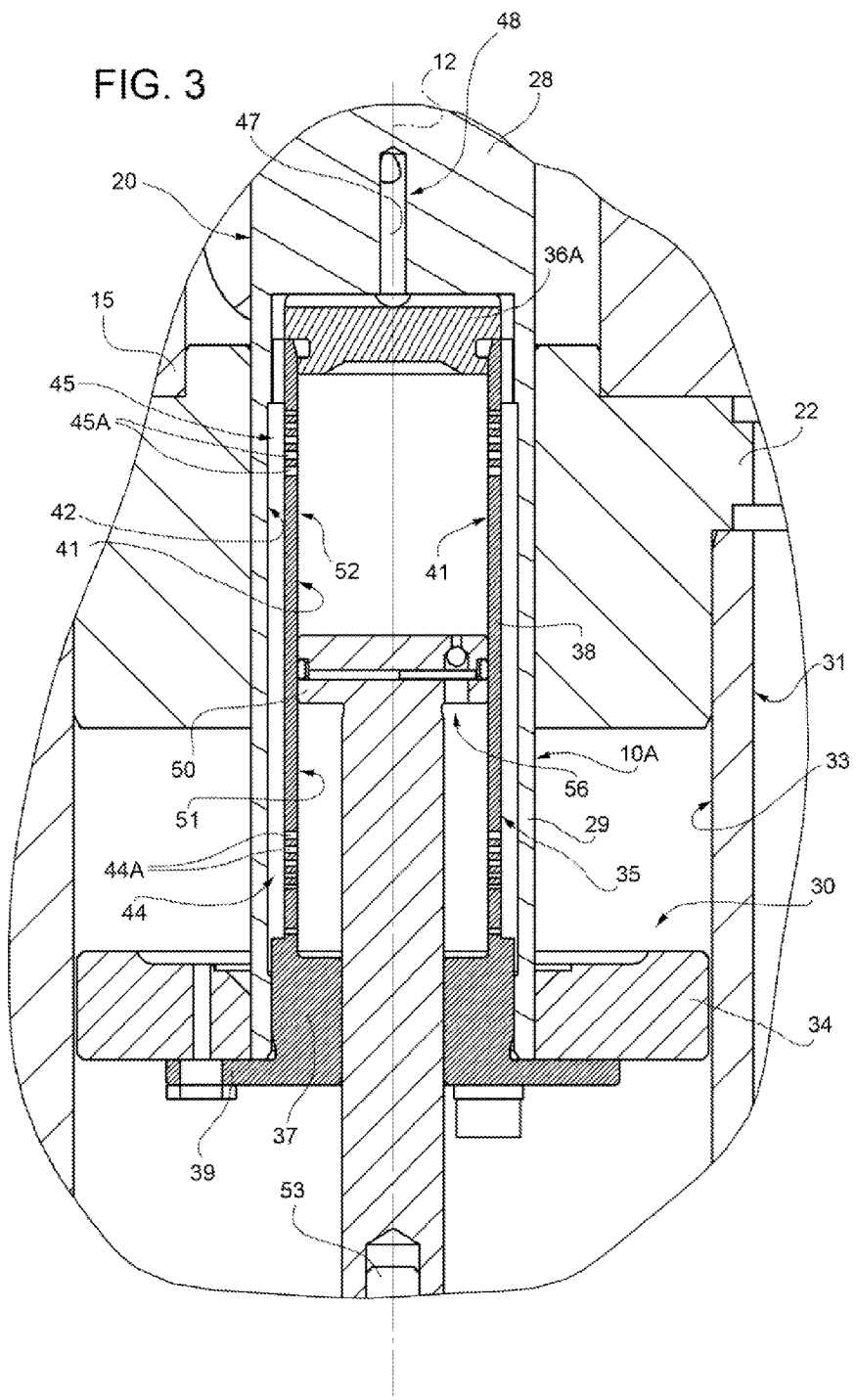

The hydraulic cartridge 35 finally comprises a piston 50, which runs in fluid-tight manner fluid inside the cylindrical chamber 41 and divides the chamber 41 itself into two variable-volume chambers, indicated by reference numerals 51 and 52 in FIG. 3. The piston 50 is integrally connected to an upper end of a rod 53 coaxial to axis 12 and has one opposite end stably connected to the bottom wall 32, conveniently by means of a screw 55.

The cartridge 35 finally comprises a ball check valve 56 conveniently obtained within the piston 50 and adapted to permit the free transit of the liquid from the chamber 52 towards the chamber 51 and to prevent the transit of the liquid itself from the chamber 51 towards the chamber 52.

In use, the jack 30 displaces the shaft 10 in opposite directions along the axis 12, the cam and tappet assembly 25 rotates the shaft 10 about the axis 12, while the hydraulic cartridge 35 controls the motion law of the shaft 10, and thus of the member 5, continuously (i.e. in each instant of the displacement) and independently from the direction of displacement. In other words, the hydraulic cartridge 35 controls the speed of the piston 34 both during the step of descending of the member 5 towards the mold 3 and during the step of distancing from the member 5 of the mold 3 itself thus preventing the generation of counter-pressures in the upper and lower chambers 30 of the pneumatic cylinder and preventing the member 5 from being subjected to sudden accelerations or decelerations, to vibrational states and/or end of travel shocks.

The above is consequent to the fact that the hydraulic cartridge 35 comprises two series 44 and 45 of holes crossed by the operative liquid and selectively and gradually closed by the piston 34 when the member 5 is arranged near the mentioned operative and resting positions, and in that the holes 44A and 45A of each series of holes 44 and 45 are calibrated holes of decreasing diameter towards the dead points. In this manner, the damping increases in the last stretches of both the downward and the upward movement by effect of the gradual decrease of the passage section of the operative liquid, while a nearly constant translation speed can be maintained in the remaining intermediate stretch, and in all cases precisely the translation speed defined during the step of designing regardless of the required motion law.

By avoiding slowing or stopping of the shaft 10 and the formation of vibrational states in any point of the displacement path, it is then possible to define movement profiles such to reduce the displacement times, and thus the cycle time, in both directions.

The arrangement of the cartridge 35 along displacement axis 12 of the shaft 10 and, in all cases, within the rod 29 of the pneumatic jack 31, which in practice constitutes an extension of the shaft 10 itself, allows, on one hand, to make an actuation assembly which is extremely compact and thus suited to be used on any type of machine and which can replace the traditional actuation devices already operating on the known machines and, on the other hand, allows to make an actuating assembly in which the hydraulic damping device is protected from external elements and from thermal emissions. The coaxiality between cartridge 35 and axis 12 then prevents the transmission of bending moments of the piston 34, which may thus be made lighter because it is less biased, or only axially biased.

In addition to this, the arrangement of the cartridge 35 on the lower axial end of the assembly 1 considerably facilitates the normal maintenance and/or replacement operations of the cartridge 35 itself, which may be performed simply by axially pulling out/inserting the cartridge 35 on the rod 29.

On the other hand, the fact that the damping cartridge 35 is arranged under the cam and tappet assembly 25 allows to feed the cartridge 35 using the same lubricating oil as the cam and tappet assembly 25 instead of a dedicated liquid. Thus, in practice, the operative liquid feeding circuit provided in the known solution to feed the damping device is eliminated with evident advantages in terms of construction and maintenance costs.

In parallel, the speed control of the operative member in both directions is considerably improved because the described cartridge 35 is a hydraulic damping which works with nearly linear damping law.

Furthermore, the fact that the oil circulates in chambers and ducts ail obtained in the shaft 10, or in all cases within a limit surface which laterally delimits the shaft 10 itself or the rod 29, allows to protect the oil from sources of heat present aboard the machine and from the risk of fire without the need to make dedicated heat barriers or complex conveying circuits in addition to reducing the circulating oil mass.

In addition to this, in the described assembly 1, the entire oil mass is placed inside the box 2, i.e. away from the mold 3, in which the ventilated cooling air of the machine and of the meld is present, which thus cooperates also for the cooling of the assembly 6.

Besides, the fact of supporting the intermediate part 19 to which the tappet element 27 is coupled by means of a pair of guides obtained in the bodies 16 and 22 and arranged on axial opposite parts of the tappet element 27 drastically reduces the entity of the deformations suffered by the shaft by one order of size. Indeed, unlike the known solutions, the shaft no long works overhangingly but is guided on both ends thus making the running of the tappet element 27 on the cam 26 smooth and stable. This translates into an increase of the operative life of the assembly 25 by effect of the lesser wear of the relatively moving parts and a considerable reduction of the vibrations on the described group 6, and consequently on the operative member 5.

Finally, since the section of the portion 19 which crosses the chamber 24 is constant, the volume of the oil present in the chamber 24 itself remains constant during the translation of the shaft 10. Indeed, with respect to the known solutions, in which the shaft is plunging, the constant section avoids overpressure or vacuum in the chamber 24, in which the oil is always ensured.

From the above, it is apparent that changes and variants may be made to the described assembly 6.

In particular, the series of holes, the geometry features and sizes of the holes 44A and 45A and their arrangement along axis 12 may also be different from those described by way of example. In particular, only one of two described series 44 and 45 of holes may be provided.

Furthermore, the cartridge 35 could always be housed in the shaft 10 or in the rod 29 of the piston but in eccentric position with respect to the axis 12, and the rod 29 could not be defined by the extension of the shaft 10 but, for example, by a distinct portion connected to the shaft in coaxial position with respect to the axis 12 or not.

Furthermore, the common hydraulic circuit could be made in different manner from that indicated and may use at least one duct or a stretch of pipes external to the shaft 10.

Finally, the common hydraulic circuit could be replaced by two distinct and independent hydraulic circuits, extending either partially or totally within the shaft or an outer peripheral surface of the frame 8.

Finally, the cam and tappet assembly may be constructively different from that described.

The invention claimed is:

1. An actuating assembly for moving an operative member of a glassware forming machine, the assembly comprising a connecting frame adapted to be fixed to a supporting structure of the machine; a shaft for supporting the operative member and coupled to the connecting frame so as to translate and rotate about a fixed axis thereof; a pneumatic jack for displacing said shaft along said axis and comprising a rod connected to said shaft and a piston; a cam and tappet device for rotating the shaft in opposite directions about said axis; and hydraulic means for stabilizing the motion of said supporting shaft; characterized in that said rod comprises at least one hollow portion, and in that said stabilizing hydraulic means are housed in said hollow portion.

2. An assembly according to claim 1, characterized in that said rod defines an extension of said shaft.

3. An assembly according to claim 1, characterized in that said shaft and said hollow portion define parts of a body made in one piece.

4. An assembly according to claim 1, characterized in that said stabilizing hydraulic means extend coaxially and symmetrically in relation to said axis.

5. An assembly according to claim 1, characterized in that said stabilizing hydraulic means comprise a hydraulic damping cartridge, in turn comprising a closing head firmly connected to said hollow portion; a liner fluid-tightly connected to said closing head and delimiting an annular first chamber, together with said hollow portion, and a second chamber, together with the closing head, both said first and second chambers accommodating an operative liquid; and a piston, which is fixed with respect to said connecting frame and is movable with respect to said liner in said second chamber; said fixed piston splitting said second chamber into two variable-volume chambers; said liner comprising calibrated through holes putting into communication said first chamber with at least one of said variable-volume chambers, and closable by said piston during the displacement of said shaft.

6. An assembly according to claim 5, characterized in that said liner comprises two series of calibrated holes, which are axially spaced from one another along said axis.

7. An assembly according to claim 6, characterized in that said second chamber is axially delimited by two axial surfaces facing each other; one of said series of calibrated holes being obtained in a position adjacent to each of said axial surfaces.

8. An assembly according to claim 5, characterized in that said stabilizing hydraulic means comprise unidirectional valve means carried by said piston.

9. An assembly according to claim 5, characterized in that said hollow portion has an axial opening for inserting/extracting said cartridge.

10. An assembly according to claim 1, characterized in that said stabilizing hydraulic means comprise an operative liquid, and in that said operative liquid lubricates said cam and tappet device.

11. An assembly according to claim 10, characterized in that said cam and tappet device is arranged along said axis between a connecting point of said pneumatic jack and a connecting point of said operative member.

12. An assembly according to claim 1, characterized in that said stabilizing hydraulic means and said cam and tappet device are connected to a single closed hydraulic circuit which is completely housed in said casing.

13. An assembly according to claim 12, characterized in that said cam and tappet device comprises a hollow body delimiting a chamber for housing a earn and tappet assembly and a liquid mass lubricating said cam and tappet assembly; said chamber being hydraulically connected to said stabilizing hydraulic means through a duct, which extends completely inside said shaft.

14. An assembly according to claim 1, characterized in that said cam and tappet device comprises a cam fixed to said frame and a tappet element carried by said shaft; first and second means for guiding said shaft being arranged along said axis on opposite axial sides of said tappet element.

15. An assembly according to claim 14, characterized in that said shaft has a constant section between said first and second guiding means.

* * * * *